United States Patent
Dominguez

(10) Patent No.: US 9,561,873 B2
(45) Date of Patent: Feb. 7, 2017

(54) GIMBAL OVER RATE PREVENTION SYSTEM AND METHOD

(71) Applicant: HONEYWELL INTERNATIONAL INC., Morristown, NJ (US)

(72) Inventor: Jose Dominguez, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 384 days.

(21) Appl. No.: 14/185,303

(22) Filed: Feb. 20, 2014

(65) Prior Publication Data

US 2015/0232203 A1   Aug. 20, 2015

(51) Int. Cl.
*B64G 1/28* (2006.01)
*B64G 1/24* (2006.01)
*B64G 1/36* (2006.01)

(52) U.S. Cl.
CPC ........... *B64G 1/286* (2013.01); *B64G 1/24* (2013.01); *B64G 1/36* (2013.01); *Y10T 74/1229* (2015.01)

(58) Field of Classification Search
CPC ............ B64G 1/286; B64G 1/24; B64G 1/36; Y10T 74/229
USPC ........................................................ 701/13
See application file for complete search history.

(56) References Cited

U.S. PATENT DOCUMENTS

| 3,736,791 A | 6/1973 | Cantwell et al. |
| 3,741,500 A | 6/1973 | Liden |
| 3,762,226 A | 10/1973 | Davis et al. |
| 3,968,352 A | 7/1976 | Andeen |
| 4,260,942 A | 4/1981 | Fleming |
| 4,881,800 A | 11/1989 | Fuchs et al. |
| 5,196,774 A | 3/1993 | Baciak et al. |
| 5,274,314 A | 12/1993 | Maqueira |
| 6,021,979 A * | 2/2000 | Bender et al. ............... 244/164 |
| 6,138,952 A | 10/2000 | Holmes |
| 6,341,750 B1 * | 1/2002 | Chu et al. ..................... 244/165 |
| 6,517,029 B1 | 2/2003 | Holmes |
| 7,690,602 B2 | 4/2010 | Jackson et al. |
| 8,014,911 B2 | 9/2011 | Hamilton et al. |
| 2007/0252044 A1* | 11/2007 | Jackson et al. ............... 244/165 |
| 2009/0001220 A1* | 1/2009 | Peck et al. ..................... 244/171 |

FOREIGN PATENT DOCUMENTS

GB    1549544    8/1979

* cited by examiner

*Primary Examiner* — Fadey Jabr
*Assistant Examiner* — Yazan A Soofi
(74) *Attorney, Agent, or Firm* — Ingrassia, Fisher & Lorenz, P.C.

(57) ABSTRACT

A system and method for preventing a gimbal from exceeding a predetermined gimbal rate limit includes receiving a gimbal rate command and a gimbal rate feedback signal representative of sensed gimbal rate. The gimbal rate command and the gimbal rate feedback signal are compared, in a control circuit, to determine a gimbal rate error. A predetermined gain scaling factor is applied, in the control circuit, to the gimbal rate command to generate a scaled gimbal rate command. The gimbal is disabled when the gimbal rate error is greater than or equal to the scaled gimbal rate.

13 Claims, 3 Drawing Sheets

GIMBAL OVER RATE PREVENTION SYSTEM AND METHOD

STATEMENT REGARDING FEDERALLY SPONSORED RESEARCH OR DEVELOPMENT

This invention was made with support under Subcontract No. R008.2 awarded by the Government. The Government has certain rights in this invention.

TECHNICAL FIELD

The present invention generally relates to control moment gyros, and more particularly relates to a system and method for preventing gimbal over rate conditions for control moment gyros.

BACKGROUND

Attitude control in many spacecraft is implemented using one or more control moment gyros (CMGs). A CMG is a torque-generating mechanism that may include a rotating flywheel, or rotor, that is rotationally mounted in a gimbal. A spin motor may be coupled to the rotor and may be energized and controlled to rotate the rotor about a spin axis at a substantially constant rotational velocity. The gimbal may be rotationally mounted about one or more gimbal axes, which are perpendicular to the spin axis. Additionally, one or more gimbal motors may be coupled to the gimbal and, in response to gimbal rate commands, may rotate the gimbal about one or more of the gimbal axes. By rotating the frame about one or more of the gimbal axes at certain rates, torques can be generated in the spacecraft body to implement spacecraft attitude control.

It is postulated that the above-described CMGs could undergo certain unlikely events. Such unlikely events include, for example, the gimbal feedback path being opened or otherwise becoming unavailable. If such an unlikely event were to occur, the CMG could become unstable and the CMG gimbal rate could reach levels that could potentially damage the CMG. To prevent gimbal rates from reaching such levels, many CMGs include a mechanism to detect a gimbal over rate and disable the gimbal upon detecting the gimbal over rate. Unfortunately, with presently known systems and methods, there is an undesirable time delay between detecting the over rate condition and disabling the CMG.

Hence, there is a need for a system and method of preventing CMG gimbal overate that does not include an undesirably long time delay, and that does not interfere with the typical rate overshoot that the CMG encounters during normal operations. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for preventing a gimbal from exceeding a predetermined gimbal rate limit includes receiving a gimbal rate command and a gimbal rate feedback signal representative of sensed gimbal rate. The gimbal rate command and the gimbal rate feedback signal are compared, in a control circuit, to determine a gimbal rate error. A predetermined gain scaling factor is applied, in the control circuit, to the gimbal rate command to generate a scaled gimbal rate command. The gimbal is disabled when the gimbal rate error is greater than or equal to the scaled gimbal rate.

In another embodiment, a control moment gyro (CMG includes a gimbal, a CMG rotor, a gimbal motor, a rate sensor, and a gimbal control. The gimbal is configured to rotate about a gimbal axis. The CMG rotor is rotationally coupled to the gimbal and is configured to rotate about a spin axis that is perpendicular to the gimbal axis. The gimbal motor is coupled to the gimbal, is adapted to be selectively energized, and is configured, upon being energized, to rotate the gimbal at a gimbal rate about the gimbal axis. The rate sensor is configured to sense the gimbal rate and supply gimbal rate feedback signals representative of sensed gimbal rate. The gimbal control is coupled to receive gimbal rate commands and the gimbal rate feedback signals. The gimbal control is configured, upon receipt of the gimbal rate commands and the gimbal rate feedback signals, to (i) compare the gimbal rate commands and the gimbal rate feedback signals to determine a gimbal rate error magnitude, (ii) apply a predetermined gain scaling factor to the gimbal rate command to generate a scaled gimbal rate command, and (iii) de-energize the gimbal motor when the gimbal rate error magnitude is greater than or equal to the scaled gimbal rate.

In yet another embodiment, an attitude control system includes an attitude control and a control moment gyro. The attitude control is configured to selectively supply the gimbal rate commands. The CMG is configured to rotate about a gimbal axis. The CMG is coupled to receive the gimbal rate commands and is configured, upon receipt thereof, to rotate at the commanded gimbal rate about the gimbal axis. The CMG includes a rate sensor and a gimbal control. The rate sensor is configured to sense gimbal rate and supply a gimbal rate feedback signals representative of sensed gimbal rate. The gimbal control is coupled to receive the gimbal rate commands and the gimbal rate feedback signals. The gimbal control is configured, upon receipt of the gimbal rate commands and the gimbal rate feedback signals, to (i) compare the gimbal rate commands and the gimbal rate feedback signals to determine a gimbal rate error magnitude, (ii) apply a predetermined gain scaling factor to the gimbal rate command to generate a scaled gimbal rate command, and (iii) supply a gimbal disable signal when the gimbal rate error magnitude is greater than or equal to the scaled gimbal rate.

Furthermore, other desirable features and characteristics of the system and method for preventing gimbal over rate conditions will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
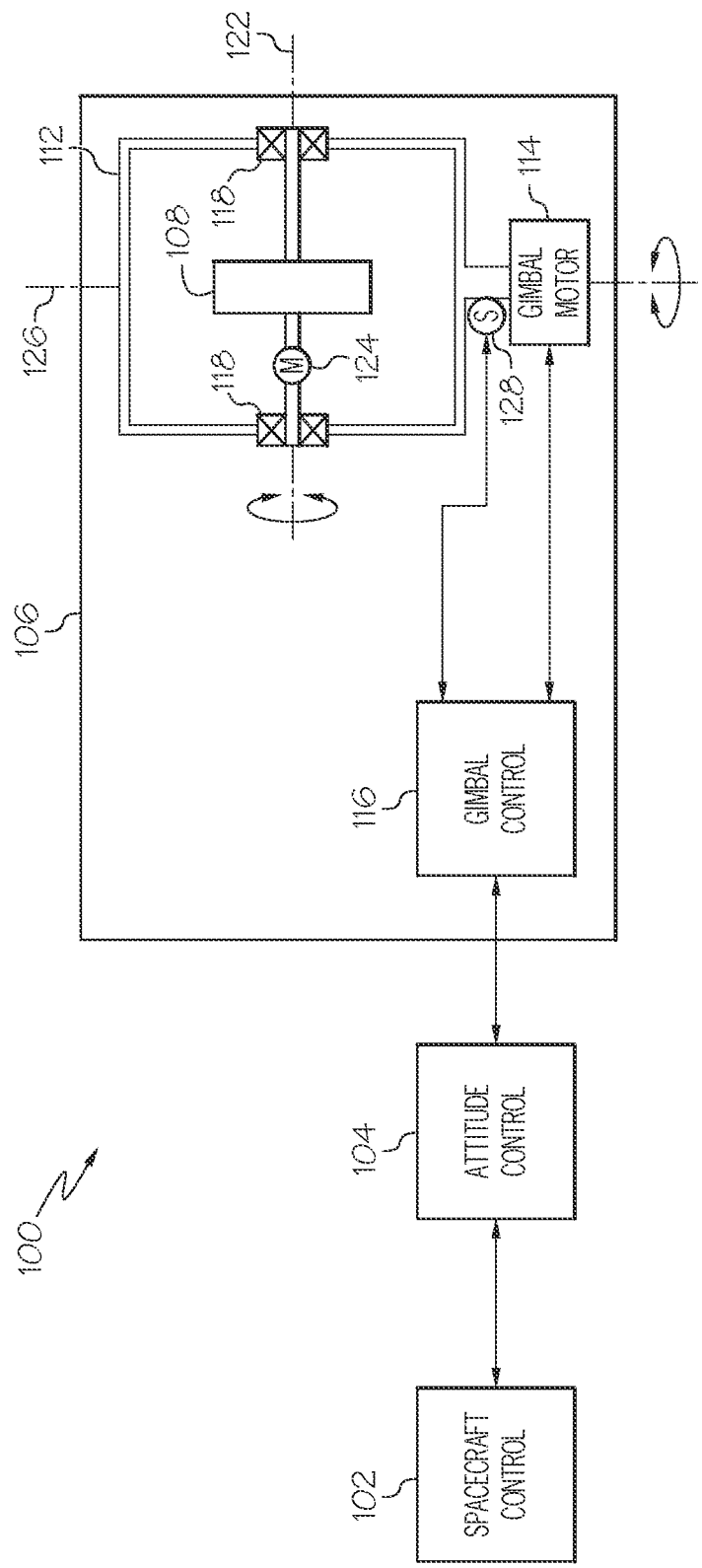
FIG. 1 depicts a functional block diagram of a portion of one embodiment of an attitude control system.

Referring to FIG. 1, a simplified schematic block diagram of a portion of one embodiment of an attitude control system 100 is depicted. The depicted system 100 is for a spacecraft and includes a spacecraft control 102, an attitude control 104, and a plurality of control moment gyros (CMGs) 106. Before proceeding further, it is noted that for clarity, and for ease of depiction and description, only a single CMG is shown. It will be appreciated, however, that the system 100 may include three or more CMGs.

Returning again to the description of the system 100, the spacecraft control 102 is configured to receive data representative of desired spacecraft attitude from, for example, an earthbound station or a non-illustrated onboard autopilot. The spacecraft control 102, in response to the received data, supplies appropriate attitude (or torque) commands to the attitude control 104. The attitude control 104, in response to the torque commands, appropriately controls the operation of the CMG 106 to induce appropriate attitude disturbances in the spacecraft, and thereby control spacecraft attitude. One or more non-illustrated spacecraft dynamic sensors, such as one or more attitude sensors and one or more rate sensors, sense spacecraft attitude and attitude rate-of-change, respectively, and supply feedback signals representative thereof to the attitude control 104.

The CMG 106 may be used in conjunction with other CMGs 106 to control spacecraft attitude. In the depicted embodiment, the CMG 106 includes a CMG rotor 108, a gimbal 112, one or more gimbal motors 114, and a gimbal control 116. The CMG rotor 108 is rotationally supported on the gimbal 112 via, for example, a plurality of bearing assemblies 118, and is configured to rotate about a spin axis 122. A spin motor 124 is coupled to the CMG rotor 108 and is adapted to be selectively energized. The spin motor 124 is configured such that, when it is energized, it rotates the CMG rotor 108 about the spin axis 122.

The gimbal 112 is rotationally supported and is configured to rotate about one or more gimbal axes 126, which are perpendicular to the spin axis 122. Each gimbal motor 114 is coupled to the gimbal 112. Each gimbal motor 114 is adapted to be selectively energized and is configured, upon being energized, to rotate the gimbal 112 at a gimbal rate about the appropriate gimbal axis 126. A rate sensor 128 coupled to the gimbal 112 is configured to sense the gimbal rate and supply gimbal rate feedback signals representative of sensed gimbal rate to the gimbal control 116.

The gimbal control 116 is coupled to receive gimbal rate commands from, for example, the attitude control 104. The gimbal control 116 is additionally coupled to receive the gimbal rate feedback signals. The gimbal control 116 is configured, upon receipt of the gimbal rate commands and the gimbal rate feedback signals, to control the gimbal motor 114 to thereby control the rate at which the CMG 106 moves. The gimbal control 116 is also configured to prevent an over rate condition. That is, to prevent the gimbal rate from exceeding a predetermined maximum rate. An over rate condition can occur, for example, in the unlikely event the gimbal rate feedback signals are lost or otherwise become unavailable. It will be appreciated that the gimbal control 116 may be implemented using analog circuitry, digital circuitry, or various combinations thereof.

Figure 2:
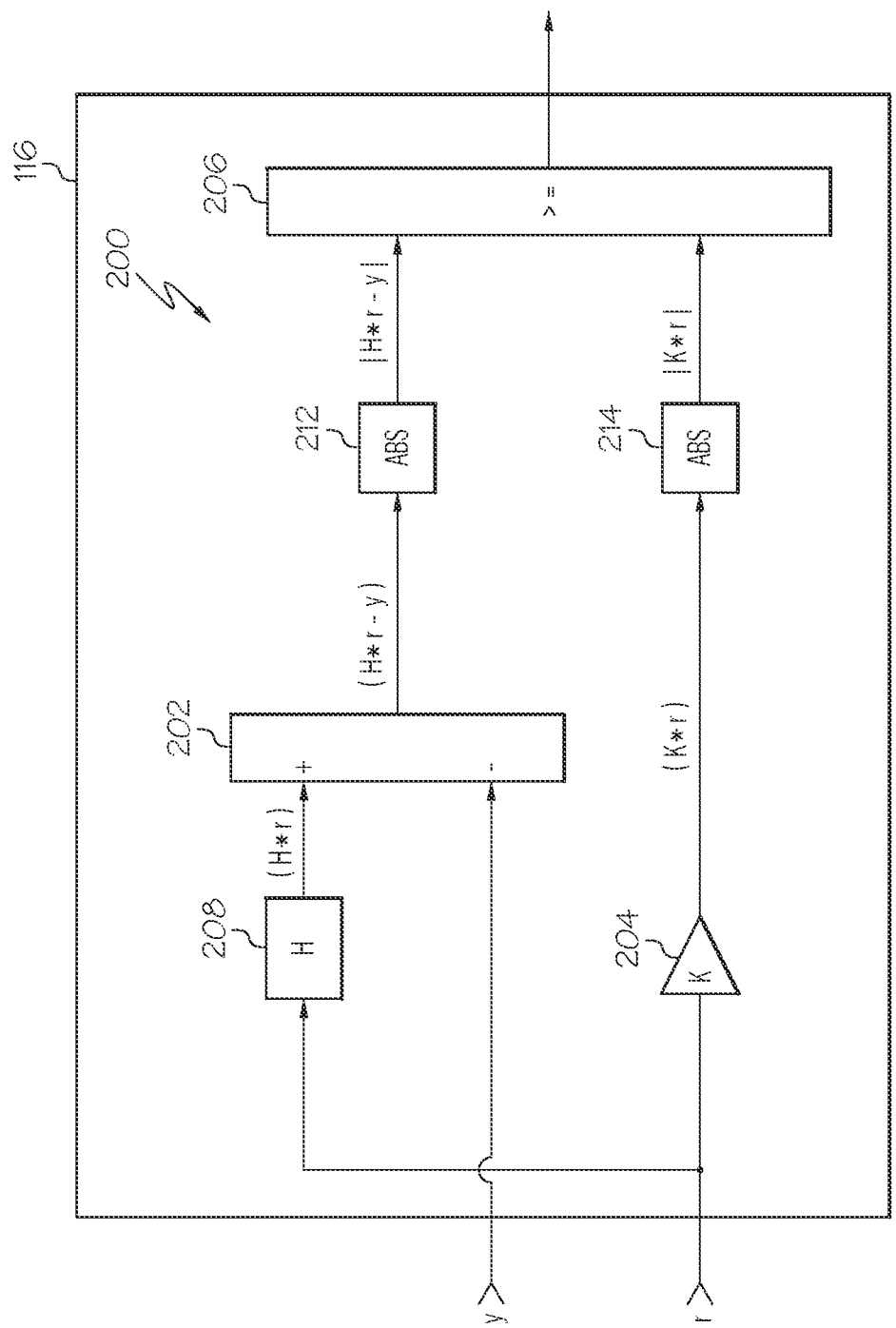
FIG. 2 depicts a functional representation of a control law that is implemented by a gimbal controller of the system of FIG. 1.

To implement the above-described gimbal over rate prevention functionality, the gimbal control 116 is further configured to implement the control law depicted in FIG. 2. This control law 200, which may be implemented using one or more processors, includes a comparator 202, a gain 204, and a relational operator 206. The comparator 202 is coupled to receive the gimbal rate commands (r) and the gimbal rate feedback signals (y). It is noted that in the depicted embodiment the control law 200 additionally includes a low-pass filter 208. The low-pass filter 208, if included, is configured to filter, and thereby supply a relatively small delay to the gimbal rate commands (r), and then supply the delayed gimbal rate commands (H*r) to the comparator 202. The comparator 202 is configured to compare the gimbal rate commands (H*r) and the gimbal rate feedback signals (y) to determine a gimbal rate error (H*r−y).

The gain 204 is coupled to receive the gimbal rate commands and is configured to apply a predetermined gain scaling factor (K) to the gimbal rate commands (r) to thereby generate scaled gimbal rate commands (K*r). The scaled gimbal rate commands (K*r) and the gimbal rate error (H*r−y) are both supplied to the relational operator 206, which is configured to determine if the gimbal rate error (H*r−y) is greater than or equal to the scaled gimbal rate (K*r). If the gimbal rate error is greater than or equal to the scaled gimbal rate, then the relational operator 206 supplies a command that de-energizes the gimbal motor 114. If, however, the gimbal rate error is less than the scaled gimbal rate, then the relational operator 206 does not supply this command and gimbal motor operation continues.

It is noted that in some embodiments, such as the one depicted in FIG. 2, the gimbal rate error and scaled gimbal rate commands are supplied to absolute value functions before being supplied to the relational operator 206. In particular, the gimbal rate error (H*r−y) is supplied to a first absolute value 212 function, and the scaled gimbal rate commands (K*r) are supplied to a second absolute value function 214. Thus, gimbal rate error magnitudes (|H*r−y|) and scaled gimbal rate command magnitudes (|K*r|) are supplied to the relational operator 206. Thus, the control law 200, in the depicted embodiment, supplies the command that de-energizes the gimbal motor 114, and thereby disable the gimbal 112, when the following relationship is true:

$$|H*r-y| >= |K*r|.$$

Figure 3:
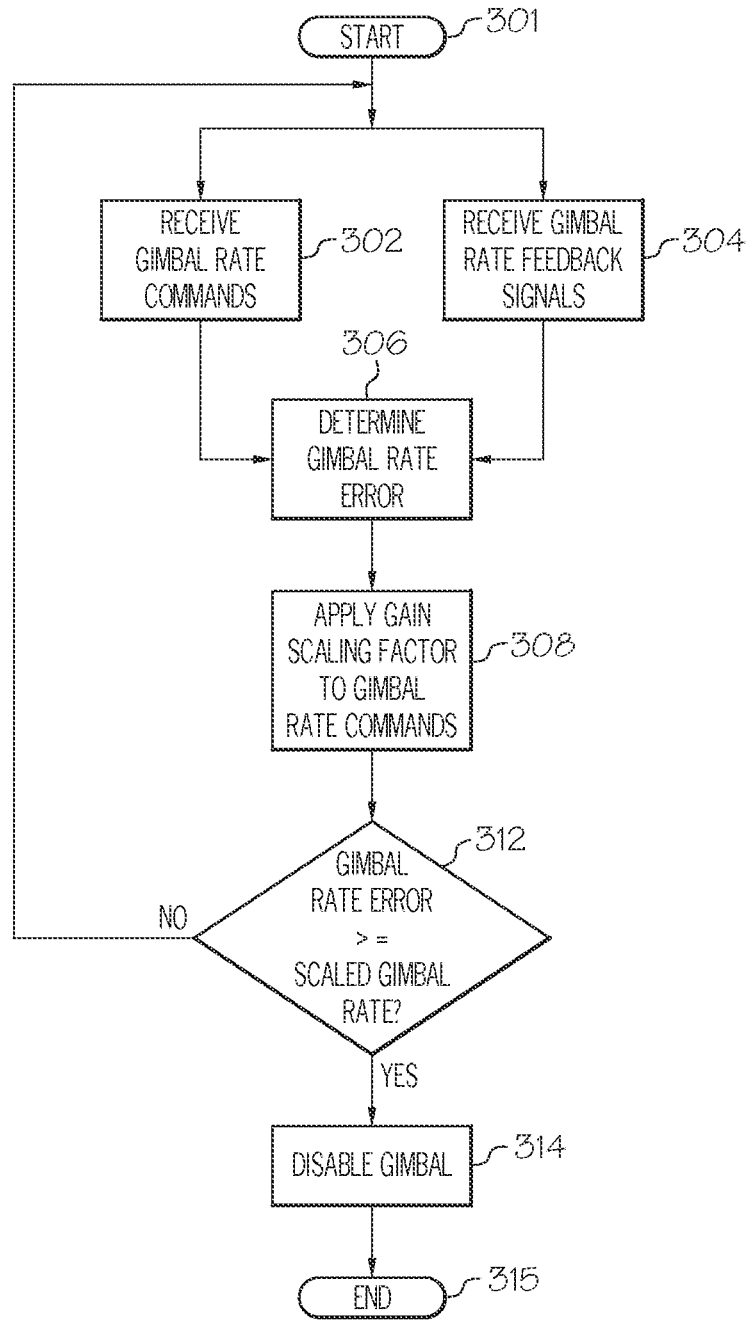
FIG. 3 depicts a process, in flowchart form, that may be implemented by the control law of FIG. 2.

Having described the structure and function of the system 100, gimbal control 116, and control law 200, the process implemented by the gimbal control 116 to prevent a gimbal over rate condition will now be described. The process 300, which is depicted in flowchart form in FIG. 3, begins upon system initiation (301), at which time the gimbal control 116 begins receiving gimbal rate commands (302) and gimbal rate feedback signals (304).

The gimbal control 116 compares the gimbal rate commands and the gimbal rate feedback signals to determine a gimbal rate error (306). The predetermined gain scaling factor is applied to the gimbal rate commands to generate the scaled gimbal rate commands (308). The gimbal control 116 then determines if the gimbal rate error is greater than or equal to the scaled gimbal rate (312). If so, the gimbal control 116 supplies the command that disables the gimbal (e.g., de-energize the gimbal motor 114 from rotating, energize the gimbal motor 114 to not rotate) (314). If not, then the process 300 repeats.

The system and method described herein prevents a gimbal over rate condition while at the same time allowing for normal overshoot. The system and method does so by monitoring and detecting the magnitude of the rate error instead of monitoring only the gimbal rate feedback. The system and method described herein can be readily implemented in existing CMGs and attitude control systems, and provides several advantages over presently known over rate prevention systems and methods. In particular, the system and method disclosed herein disables the gimbal at a lower gimbal rate than presently known systems and methods, prevents damage to associated gearing by avoiding large torques, and prolongs CMG life by preventing potentially damaging gimbal rates.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for preventing a gimbal from exceeding a predetermined gimbal rate limit, comprising the steps of:
   receiving a gimbal rate command;
   receiving a gimbal rate feedback signal representative of sensed gimbal rate;
   comparing, in a control circuit, the gimbal rate command and the gimbal rate feedback signal to determine a gimbal rate error;
   applying, in the control circuit, a predetermined gain scaling factor to the gimbal rate command to generate a scaled gimbal rate command; and disabling the gimbal when the gimbal rate error is greater than or equal to the scaled gimbal rate command.

2. The method of claim 1, further comprising:
filtering the gimbal rate command in a low-pass filter after receiving the gimbal rate command.

3. The method of claim 1, wherein the disabling step comprises:
de-energizing a gimbal motor that is coupled to the gimbal.

4. The method of claim 1, further comprising:
applying, in the control circuit, a first absolute value function to the gimbal rate error to obtain a gimbal rate error magnitude; and
applying, in the control circuit, a second absolute value function to the scaled gimbal rate command to obtain a scaled gimbal rate command magnitude.

5. The method of claim 4, wherein the disabling step comprises:
disabling the gimbal when the gimbal rate error magnitude is greater than or equal to the scaled gimbal rate command magnitude.

6. A control moment gyro (CMG), comprising:
a gimbal configured to rotate about a gimbal axis;
a CMG rotor rotationally coupled to the gimbal and configured to rotate about a spin axis that is perpendicular to the gimbal axis;
a gimbal motor coupled to the gimbal, the gimbal motor adapted to be selectively energized and configured, upon being energized, to rotate the gimbal at a gimbal rate about the gimbal axis;
a rate sensor configured to sense the gimbal rate and supply a gimbal rate feedback signals representative of sensed gimbal rate; and
a gimbal control coupled to receive gimbal rate commands and the gimbal rate feedback signals, the gimbal control configured, upon receipt of the gimbal rate commands and the gimbal rate feedback signals, to (i) compare the gimbal rate commands and the gimbal rate feedback signals to determine a gimbal rate error magnitude, (ii) apply a predetermined gain scaling factor to the gimbal rate command to generate a scaled gimbal rate command, and (iii) de-energize the gimbal motor when the gimbal rate error magnitude is greater than or equal to the scaled gimbal rate command.

7. The CMG of claim 6, wherein the gimbal control further comprises:
a low-pass filter coupled to receive the gimbal rate commands and, configured, upon receipt thereof, to supply delayed gimbal rate commands.

8. The CMG of claim 6, wherein the gimbal control is further configured to:
apply a first absolute value function to the gimbal rate error to obtain a gimbal rate error magnitude; and
apply a second absolute value function to the scaled gimbal rate command to obtain a scaled gimbal rate command magnitude.

9. The CMG of claim 8, wherein the gimbal control is configured to de-energize the gimbal motor when the gimbal rate error magnitude is greater than or equal to the scaled gimbal rate command magnitude.

10. An attitude control system, comprising:
an attitude control configured to selectively supply the gimbal rate commands; and
a control moment gyro (CMG) configured to rotate about a gimbal axis, the CMG coupled to receive the gimbal rate commands and configured, upon receipt thereof, to rotate at the commanded gimbal rate about the gimbal axis, the CMG comprising:
a rate sensor configured to sense gimbal rate and supply a gimbal rate feedback signals representative of sensed gimbal rate; and
a gimbal control coupled to receive the gimbal rate commands and the gimbal rate feedback signals, the gimbal control configured, upon receipt of the gimbal rate commands and the gimbal rate feedback signals, to (i) compare the gimbal rate commands and the gimbal rate feedback signals to determine a gimbal rate error magnitude, (ii) apply a predetermined gain scaling factor to the gimbal rate command to generate a scaled gimbal rate command, and (iii) supply a gimbal disable signal when the gimbal rate error magnitude is greater than or equal to the scaled gimbal rate command.

11. The system of claim 10, wherein the gimbal control further comprises:
a low-pass filter coupled to receive the gimbal rate commands and, configured, upon receipt thereof, to supply delayed gimbal rate commands.

12. The system of claim 10, wherein the gimbal control is further configured to:
apply a first absolute value function to the gimbal rate error to obtain a gimbal rate error magnitude; and
apply a second absolute value function to the scaled gimbal rate command to obtain a scaled gimbal rate command magnitude.

13. The system of claim 12, wherein the gimbal control is configured to de-energize the gimbal motor when the gimbal rate error magnitude is greater than or equal to the scaled gimbal rate command magnitude.

* * * * *